United States Patent [19]

Eigenmann

[11] 4,049,337

[45] * Sept. 20, 1977

[54] REFLEX REFLECTING SYSTEM FOR ROAD SURFACE MARKING

[76] Inventor: Ludwig Eigenmann, Vacallo, Cantin Ticino, Switzerland

[*] Notice: The portion of the term of this patent subsequent to June 22, 1993, has been disclaimed.

[21] Appl. No.: 687,698

[22] Filed: May 19, 1976

Related U.S. Application Data

[63] Continuation-in-part of Ser. No. 428,909, Dec. 27, 1973, Pat. No. 3,964,821.

[30] Foreign Application Priority Data

Dec. 28, 1972 Italy .................................. 33710/72

[51] Int. Cl.² ............................................. G02B 5/128
[52] U.S. Cl. ........................................ 350/105; 404/9
[58] Field of Search ................... 350/105, 94, 97–103, 350/104–109; 404/9–16

[56] References Cited

U.S. PATENT DOCUMENTS 3,964,821  6/1976  Eigenmann ........................ 350/105

Primary Examiner—John K. Corbin
Assistant Examiner—B. W. delos Reyes
Attorney, Agent, or Firm—Michael J. Striker

[57] ABSTRACT

The disclosure describes, in the upwardly facing surface of a layer of material forming a traffic-regulating indicium on a road pavement, a reflective system consisting of a plurality of reflex-reflective aggregates consisting each of a main element of polymeric transparent material, partially embedded in said layer and having a convex portion projecting upwardly of said surface and having an index of refraction such that rays impinging said exposed portion at large angles of incidence are at least partially refracted into said element, said each aggregate further comprising a transparent binder substance contacting other portions of said element, said each aggregate still further comprising a monolayer of transparent beads contacting the and partially embedded into said transparent binder, having part-spherical surfaces facing away from said other portions of said element and a reflective coating provided over said part-spherical surfaces, the index of refraction $n_1$ of said main element being from 1.45 and 1.68, the index of refraction $n_3$ of said beads being from 1.60 and 1.95, and the ratio $n_3/n_2$ of the index of refraction of said beads and of said binder being from 1.135 to 1.385, the total transparency efficiency of the system being greater than 0.1 when said exposed portion are impinged by light rays not less than 80°.

8 Claims, 6 Drawing Figures

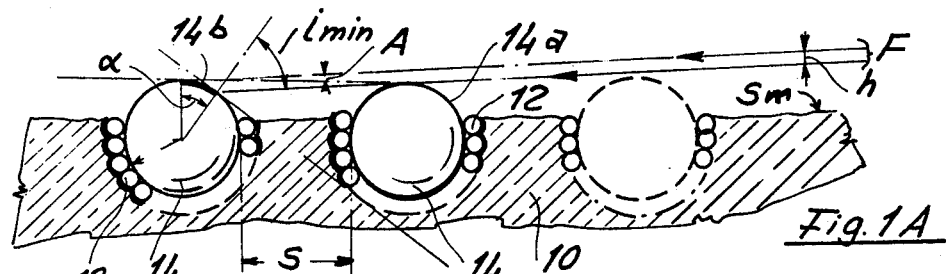
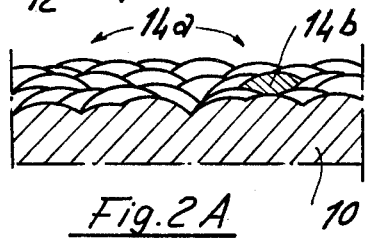
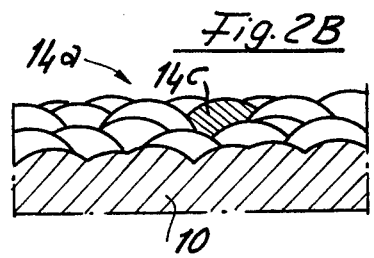
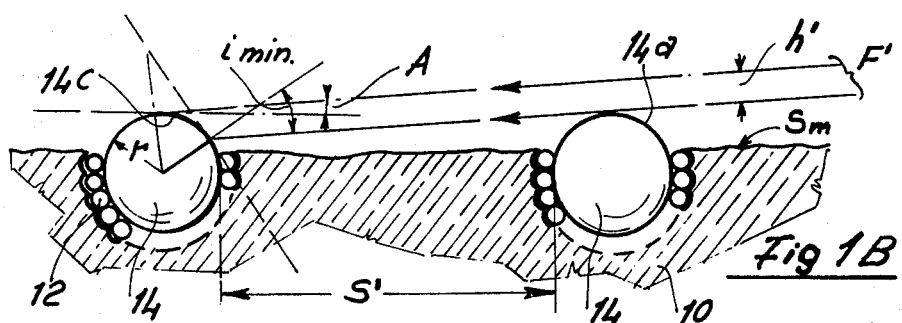
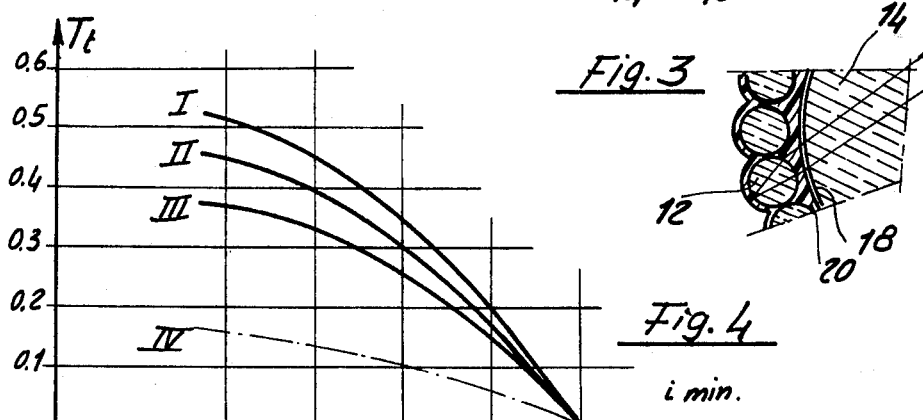
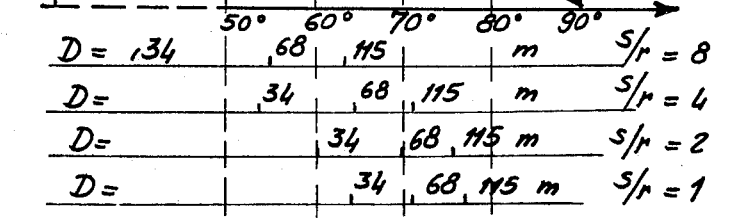

REFLEX REFLECTING SYSTEM FOR ROAD SURFACE MARKING

CROSS-REFERENCE TO RELATED APPLICATION

This application is a continuation-in-part of my prior application Ser. No. 428,909, filed Dec. 27, 1973 (now U.S. Pat. No. 3,964,821) and whose entire disclosure is incorporated herewith by reference.

BACKGROUND OF THE INVENTION a. The Field of the Invention

This invention generally relates to the art of providing road surfaces or pavements provided with traffic-regulating indicia thereon (such as for example a traffic lane dividing line) designed for ensuring improved nighttime visibility at substantial distance when illuminated by the light emitted by a vehicle headlamp, that is illuminated in a direction forming a very small angle with the generally planar surface of the road, the visibility being ensured by the reflection of the light which has impinged the indicium and has been reflected back towards the vehicles's driver.

More particularly, this invention is concerned with the art of forming, generally but not exclusively on upwardly facing surface of traffic-regulating indicia formed on or secured to a roadway pavement, a reflective system or arrangement essentially consisting of a plurality of suitably spaced reflective aggregates comprising exposed convex portions projecting upwardly of said surface each aggregate being arranged and constructed so that rays impinging said exposed portions at large angles of incidence will be retro-collimated, that is reflected back along their own path of incidence towards the source of light and therefore towards the eyes of the vehicle driver.

The expression "visible at distance" will indicate, as this description proceeds and in the appended claims, the condition that a discrete area of an indicium is to be clearly seen by a vehicle driver from a distance generally comprised from 34 m to 115 m about, that is from a distance (34 m about) at which a roadway pavement is fairly illuminatd by usual automobile headlamp switched to lower beam, to a distance (115 m) at which full power automobile headlamps are capableof illuminating obstacles, road variations and traffic signs, as necessary for high speed safe driving at nighttime.

Assuming that the eyes of an automobile driver are an average height of 1.2 m about above the road pavement, it is evident that the discrete area of the indicium of the interest is seen from a direction forming a very small angle with a general plane of the indicium that is of the refractive system associated therewith. As a matter of fact, such angle is of 2° about and respectively of 1°10′ about and of 0°40′ about when the distance is of 34 m and respectively of 68 m and 115 m about. Therefore, the field of this invention considers the various phenomena and effects concerned with the visibility of a sign associated with a reflective system seen in a direction forming a small angle, in particular comprised between 2° and 0°4′ with the general plane of the same reflective system.

b. The Prior Art

The art pertinent to this invention has been detailedly described in the Patent into which my prior application Ser. No. 428,909 now U.S. Pat. No. 3,964,821 has been matured, and which is herein incorporated by reference, and therefore further comments are unnecessary thereabout, except as hereinbelow described with relation with the new and advantageous objects of this invention.

THE OBJECTS OF THE INVENTION

In the prior patent specification there have been indicated the importance of and the effects resulting from the total transparency parameter T given by expression $T =$ transmitted light/impinging light calculated for a plurality of optical paths through transparent components having differing indexes of refraction and under different angles of incidence. There have been also explained why and how theoretically promising high relative refractive indexes will actually lead to an unacceptably loss of light as a result of either external and internal reflections along said optical paths. Critical features have been indicated for improving the said total transparency parameter.

Further extensive experimentations have now lead to the finding of certain unexpected phenomena and of a certain new and advantageous approach to the provision of reflective systems of the type referred to above of improved efficiency and which are not subject to some also unexpected or not properly recognized and considerable prejudiciable factors and conditions.

A condition which has not been heretofore evaluated consists in the fact that the various parasitic internal reflections do not simply lead to a loss of light (in terms of impinged but not properly reflected and retro-transmitted light), but to an actual light absorption within the aggregates. More particularly, it has been found that an aggregate, capable of retro-reflecting light rays which have been impinged on its exposed convex portion at the desired great angle of incidence ("grazing light"), will absorb and actually retain thereinto, as a result of a pultiple irregular internal back-and-forth or hunting reflections, a relevant part of any light beam which has impinged from a direction sharply different from that for which the aggregate has been designed for retro-reflection.

As a result of what above, there has been found that retro-reflective aggregates and systems capable of satisfying retro-reflect grazing light for good nighttime visibility, will appear dark and even very dark when illuminated from a direction sharply different from that from which the said aggregate or system of aggregates is actually seen, such as in daylight or by a source of light different from the headlamps of a vehicle the driver of which is the actual observer.

Taking into account that at the considered distances an automobile driver actually sees, of an indicium on a road pavement, provided with a relevant amount of retroreflective aggregates on its surface, only the bulging portions of same aggregates, the visibility of such indicium actually drops to undesirably low values at twilight, when driving under "city-light" in roads illuminated by street-lamps and so on.

It has been now that a great deal better approach to a more advantageous solution of the above considered problems comprises considering the traffic-regulating sign not in terms of the optical parameters and efficiency of its individual reflective aggregates, but in terms of a substantial portion of its approximately upwardly facing surface, said portion including a discrete number of aggregate, so that the actual refrectivity of indicium in service, as said its said substantial portion is seen from a distance, that is illuminated under grazing light and seen from a location near to that of the sources of said grazing light, is taken into account. In other words, the above discussed total transparency parameter is to be referred to a substantial portion of the reflective sign surface including a discrete in particular number of reflective aggregates which jointly and correlately contribute to the nighttime and also daytime visibility of the sign, at and from a substantial distance.

According to the invention, a new and surprisingly advantageous result can be attained on a marked road, comprising a roadway pavement on which there is provided a traffic-regulating indicium including a layer of material having an upwardly facing surface the entire extent of which is approximatively planar, wherein a substantial surface area of said surface includes a discrete number of reflective aggregates partially embedded in said layer, at least a part of said aggregates comprising each a substantially spherical transparent element having an exposed portion projecting upwardly of said surface and another portion projecting downwardly from said surface, said element having an index of refraction such that rays impinging said exposed portion at large angles of incidence are at least partially refracted into said element towards said another portion, and comprising further a layer of transparent binder substance contacting said another portion of said element, and reflecting means for the reflection of rays refracted into said element associated with said other portion of said element and spaced from the same by said binder substance, provided that:

a. said transparent element consists of a transparent substance the index of refraction ($n_1$) of which is comprised between 1.45 and 1.68,
b. said reflecting means consist of transparent beads partially embedded into said layer of binder substance and having a reflective coating on their part-spherical portions spaced from the associated element, said beads consisting of a transparent material the index of refraction ($n_3$) of which is comprised between 1.60 and 1.95; and
c. the ratio ($n_3/n_2$) of the index of refraction ($n_3$) of said beads relatively to the index of refraction ($n_2$) of said binder substance is comprised between 1.135 and 1.385.

Preferably, the said binder substance consists of a polymeric compound the index of refraction ($n_2$) of which is from 1.46 to 1.52.

Further preferably, at the interface between said polymeric element and said layer of binder substance an interfacial layer of finite thickness is formed wherein the index of refraction progressively varies from that ($n_1$) of said element to that ($n_2$) of said layer, whereby no light dissipation by internal reflection occurs at the passage of rays from said element and said layer and viceversa.

Other objects and advantages of the invention will be apparent from the following description, taken in conjunction with the accompanying drawing.

THE SEVERAL VIEWS OF THE DRAWING

FIGS. 1A and 1B are greatly enlarged fragmentary vertical sectional views of the upper layer of a traffic regulating indicium including a plurality of relatively closely spaced and respectively of more spaced aggregates, and illuminated and seen from a relatively great and respectively from a smaller distance;

FIGS. 2A and 2B are greatly enlarged fragmentary diagrammatical views of similarly marked surface areas, seen in the directions as considered in FIGS. 1A and 1B, respectively;

FIG. 3 is a greatly enlarged diagrammatical fragmentary sectional view of one aggregate; and FIG. 4 is a graph including a plurality of curves showing the variation of the total efficiency parameters of various examplificative embodiments of the invention, compared with that of a know structure, with angle of incidence, with the distance and with differently spaced arrangements of the aggregates on the marked area.

DETAILED DESCRIPTION OF THE PREFERRED EMBODIMENTS

Referring first to FIGS. 1A and 1B, there is indicated at 10 the upper layer of a known traffic-regulating indicium forming tape material, which is assumed to be secured on a roadway pavement (not shown) to form for example a traffic lane dividing line. The upwardly facing approximately planar marked surface of the road is indicated at Sm and a substantial plurality of reflective aggregates of the type considered is partially embedded into said layer 10. Each aggregate comprises an essentially spherical transparent element 14 having an exposed portion 14a projecting upwardly of said surface Sm and another portion projecting downwardly from said surface Sm and having a monolayer of conventionally reflectorized beads 12 thereabout, said beads 12 being connected to the element 14 by a layer 20 (FIG. 3) of a transparent binder substance.

Such aggregates are generally randomly arranged on and partially embedded in layer 10. A substantially even arrangement is however preferred, and the number of said aggregates for surface area unity is suitably selected so that a suitable average spacing of said aggregates is provided. As explained below, such average spacing can be relatively small, such as indicated at S in FIG. 1A, or relatively great, such as indicated at S' in FIG. 1B. In view of what there will be made apparent below, a suitable indication of the spacing can be made by relating same to the radius r of the elements 14, and indicated in terms of the ratio S/r, such as made in FIG. 4, irrespectively from the actual average diameter of the reflective aggregates which, according to current art, can be for example from 1.5 mm to 6 mm about, these values being not limiting for the scope of the invention.

The light rays provided by a vehicle headlamp impinge generally the exposed portions 14a of the aggregates at a small angle A (FIGS. 1A and 1B) relatively to the horizontal, that is a plane parallel to surface Sm, the amplitude of angle A being a function of the distance of the source of light and of the height of driver eyes over the roadway pavement, such height averaging generally 1.2 m about. This angle A can be therefore assumed of 2°, of 1°10' and of 0°40' when one considered impinged aggregate is at a distance of about 34 m, of 68 m and of 115 m from the source of light, the above values of distance (indicated at D in FIG. 4) have been selected for covering the usual ranges of the distance at which the roadway pavement is fairly illuminated by a motorcar headlamp system switched to "lower beam" (34 m about) to that at which a good illumination can be had by same headlamps switched to full power, as desirable for safety at highspeed for anticipated detection of curves and/or of particular signals, stops, crossings and so on.

Assuming that the parts which essentially project upwardly of the sign surface Sm are the exposed portions 14a of the aggregates, and assuming that a substantial number of aggregates, essentially evenly arranged on a substantial marked area, a grazing light the direction of which forms a given angle A (which is a function of distance D) will impinge on each exposed portion 14a in the form of an impinging beam F (or F') of "height"0 or thickness h (or h') resulting from the degree of "masking" of each portion 14a by the corresponding portions nearer to the source of light. This value h (or h') is at its turn a function of the spacing S (or S') of the aggregates, as evident from a comparison of FIGS. 1A and 1B.

The "useful" area of the portion 14a (that is the area actually impinged by light) can therefore be smaller or greater as more or respectively as less both the angle A is great or small (that is the distance D is little or respectively large) and the spacing S is small or respectively great. FIGS. 1A and 1B examplify occurrences in which, for a given angle A, the spacing S is $S/r = 2$ about and, respectively, $S/r = 6$ about. FIGS. 2A and 2B contribute to making clear that in these various conditions the useful average area 14b and respectively 14c of the aggregates varies according to the closeness of the same aggregates on the marked area.

An important consideration is to be now made. A marked area as above considered will appear to the viewer (that is to a vehicle's driver) as formed of upwardly projecting portions 14a of aggregates or, more precisely, of their areas 14b or 14c, when seen from a given distance D or greater, the marked area being provided with aggregates arranged at spacings S of a given S/r or less. From this consideration descends:

1st — that it is useless to provide a sign including too closed aggregates, except where the sign is to be very clearly seen from an average relatively short distance. Even taking into account that a somewhat excess closeness of aggregates is desirable for compensating the wearing off of the road marking material, the selection of average spacing S must be made by taking into account of what above. A thicker population of aggregates is advantageous where sharp curves or otherwise difficult roads requiring careful driving at relatively low speed are to be marked, while more spaced aggregates can preferably be used where roadways adapted for average high speeds are to be marked.

2nd — that the amplitude of the area 14b or 14c (indicated also in terms of angular amplitude "alpha" in FIG. 1A) determines also the minimal angle of incidence "$i_{min}$"0 at which a ray comprised in the beam F (or F') can impinge said area. As known from the optics and as discussed in the parent patent, the transparency parameter depends, inter alia, from the angle of incidence at the aggregate-air interface, as smaller said angle is as lower parameter being also. Therefore it will be useful that, for the considered average distance at which the marking is to best seen, the area 14b or 14c will occupy the largest compatible part of the exposed portions 14a of the aggregates.

3rd — that, as discussed above and shown in FIGS. 2A and 2B, a vehicle's driver will see, when looking from a given minimal distance D at a marking as above, a surface which is apparently made by aggregate portions 14b or 14c only. Now, there has been found that if such aggregates are so optically defined that the same are capable of retroreflect or retrocollimating grazing light only, such portions 14b or 14c will appear substantially dark (and the marking might be well not seen at all at nighttime) when the aggregates are impinged by not grazing light, such as for example when illuminated by streetlamps.

A substantial improvement to the transparency parameter is provided by forming the aggregates as diagrammatically shown in FIG. 3 and detailedly described in my prior Patent Application Ser. No. 578,922, filed May 19, 1975. According to said prior art, in an aggregate of the type considered, comprising one transparent, substantially spherical element 14, reflecting means 12, and a transparent medium 20 securing and spacing said reflecting means 12 to and respectively from said element 14, there is provided an interlayer 18 between said means 12 and said element 14, in which interlayer the refractive index progressively varies from that of said element to that of said transparent medium, whereby no loss of transparency occurs by internal reflection in the passage of light from said element to said medium and viceversa. As far as such passage is concerned, the transparency parameter can be assumed to be equal to zero.

According to the invention, the above objects and advantages are attained by so selecting the transparent compounds and materials with which the element 14, the transparent binder medium 20 and the reflectorized beads 12 are formed, having respective indexs of refraction $n_1$, $n_2$ and $n_3$ comprised in the following critical ranges:

$n_1$ from 1.45 to 1.68
$n_2$ from 1.46 to 1.56
$n_3$ from 1.60 to 1.95

Preferably the highest values of $n_3$ are associated to the greatest values of $n_1$. In general, $n_2$ is not higher than $n_1$. On the other hand, when beads 12 of relatively high $n_3$ are made use of, a somewhat divergency of the light beam passing from the element 14 to the binder medium 20 (that is $n_2$ somewhat higher than $n_1$) can be advantageous.

A few preferred Examples of selections of the refractive indexes follow, said Example relating to a structure as discussed with reference to FIG. 3:

EXAMPLE 1

$n_1 = 1.49$;   $n_2/n_1 = 1$ about;   $n_3/n_2 = 1.135$

EXAMPLE 2

$n_1 = 1.57$;   $n_2/n_1 = 1$ about;   $n_3/n_2 = 1.184$;

EXAMPLE 3

$n_1 = 1.68$;   $n_2/n_1 = 1$ about;   $n_3/n_2 = 1.385$

The Examples of the invention can be compared with the following selection and combination of refractive indexs, according to prior art:

$n_1 = 1.90$; $n_1/n_2 = 1.37$; $n_3/n_2$ 1.90;

It can be considered that the prior art has suggested that $n_1$ (of the element) should be substantially higher than $n_2$ (of the binder), that $n_1$ (of the element) should have an index of refraction sharply higher than that of air, and that $n_3$ (of the beads) should be sharply higher than $n_2$ (of the binder.

The graph of FIG. 4 comprises curves which are representative of the "Total transparency parameter", indicated at $T_t$ plotted upon either calculation and by actual meansurements, which represent the brilliancy or, more properly, the total amount of the light retroreflected by a substantial area of a marking (actually, 0.2 m² about) including a relevant number of reflective aggregates, for $i_{min}$ comprised from 50° to 90°. In consideration of the fact that $i_{min}$ is a function of angle A and therefore of the distance D of the source of light (assumed at a level of 1.2 m above the roadway pavement), the graph is provided also with scales, parallel to the abscissa, wherein various distances D are indicated, in meters, corresponding to the various $i_{min}$, for various spacings D of the aggregates, in terms of S/r, which leads to a variation of amplitude of the impinged portions 14b or 14c, that is of the amount of the light which can actually impinge on exposed portions of the aggregates and at least a part of which can be reflectorized.

The curves I, II and III indicated the total transparency parameter corresponding to the combination and selection of refractive indexes indicated in the Example 1, 2 and 3, respectively. The curve IV (in dot-and-dash line) corresponds to the above indicated comparison arrangement as taught by prior art.

From said graph there is apparent that the selection of the invention provides a retrocollimating marking having brilliancies, at any distance D at which the marking is illuminated can be seen (over 115 m) well greater than that a prior art aggregate can provide for a very short distance (less than 34 m) for reasonably close arrangements of aggregates on the marked area. In this occurrence it can also be considered that a minimal incidence angle $i_{min}$ less than 50° can be disregarded, bacause in general the average amount of the projection of portions 14a upwardly of the sign surface Sm does not admit such smaller incidencies.

The said curves I to IV have been in particular verified from the following values, obtained by integrating by computer calcolation the various factors which influence the transparency and response to light impinging at all incidence angles from 90° to the various $i_{min}$, for the various actually impinged areas such as indicated at 14b and 14c. Said values are grouped in the following Table.

TABLE

| $i_{min}$ | 50° | 60° | 70° | 80° |
|---|---|---|---|---|
| $T_t$ of Example 1 | 0.508 | 0.446 | 0.342 | 0.184 |
| $T_t$ of Example 2 | 0.450 | 0.395 | 0.303 | 0.164 |
| $T_t$ of Example 3 | 0.367 | 0.320 | 0.244 | 0.132 |
| $T_t$ of prior art | 0.164 | 0.134 | 0.101 | 0.054 |

It has been surprisingly found that the apparent "darkness" of marked area, when illuminated by not grazing light but seen from a grazing direction, that is from the considered level above the roadway pavement and sistances D, is substantially an inversed function of $T_t$. Such "apparent darkness" can therefore be measured in terms of $1 - T_t$. It is evident that the invention provides an advantageous marking also from the point of view of its visibility when not illuminated by grazing light, such as by street lamps, in twilight, rainy weather and so on.

According to an important feature of the invention, the individual aggregates are manufactured by making use of transparent polymeric substances as to their essentially spherical transparent elements and their binder or intermediate layers are concerned. Resinous materials having both the desired refractive index and the most desirable resistance to traffic and weather are available. The entire above indicated range for $n_1$ can be covered by a plurality of polymeric substance such as from polypentene (providing $n_1 = 1.46$) to vinyl-naphthalene (for $n_1 = 1.68$). The preferred range for $n_1$ is from 1.485 and 1.62 and therefore the elements 14 can be made of polymeric substance selected in the group comprising the polymethylmethacrylates, the methyl styrene - methylmethacrylate copolymers, the styrene - acrylonitrile copolymers, the polycarbonates, and the epoxy polymers, the selection being dictated by the specific service and average weather and climate.

The intermediate or binder layer 20, having the required refractive index $n_2$, is preferably formed by using cross-linkable heatsetting copolymers, capable of acquiring, when set, an excellent resistance to the most commonly used solvents (in the paints such as ketone, aromatic and chlorinated esters) and also to the monomers and low-polymers which are commonly present in the two-component resins made use of in the art of applying roadway surface marking tapematerials (such as amines, acryl monomers, isocyanates and so on).

The above indicate range for $n_2$ can be obeyed by making use, for forming the transparent binder layer, of a polyurethane resin of aliphatic nature or of a cycloaliphatic epoxy resin. The combined use of polymeric compounds for forming the element 14 and the binder layer 20 provides for the forming also of the interfacial layer 18, as discussed above with reference to FIG. 3, because a substantial molecular interdiffusion occurs about the interface at which the associated resinous components, where the component of the layer 20 is applied in monomeric or low-polymeric status, are caused to contact each other, to provide the desired progressive variation of $n_1$ to $n_2$ through the thus formed interfacial transitional layer 18.

I claim:

1. On a marked road roadway pavement, a traffic-regulating indicium including a layer of material having a upwardly facing surface the entire extent of which is approximately planar, wherein a substantial surface area of said surface includes a discrete number of reflective aggregates partially embedded in said layer, at least a part of said aggregates comprising each a substantially spherical transparent element having an exposed portion projecting upwardly of said surface and another portion projecting downwardly from said surface, said element having an index of refraction such that rays impinging said exposed portion at large angles of incidence are at least partially refracted into said element towards said another portion, and comprising further a layer of transparent binder substance outwardly surrounding said another portion of said element, and reflecting means for the reflection of rays refracted into said element associated with said other portion of said element and spaced from the same by said binder substance, provided that:
  a. said transparent element consists of a transparent polymeric substance the index of refraction ($n_1$) of which is comprised between 1.45 and 1.68,
  b. said reflecting means consist of transparent beads partially embedded into said layer of binder substance and having a reflective coating on their part-spherical portions spaced from the associated element, said beads consisting of a transparent material the index of refraction ($n_3$) of which is comprised between 1.60 and 1.95; and
  c. the ratio ($n_3/n_2$) of the index of refraction ($n_3$) of said beads relatively to the index of refraction ($n_2$) of said binder substance is comprised between 1.135 and 1.385.

2. In the traffic-regulating indicium defined in claim 1, reflective aggregates including a binder substance the index of refraction of which is from 1.46 to 1.52.

3. In the traffic-regulating indicium defined in claim 1, reflective aggregates wherein the transparent compounds and materials with which the element, the transparent binder medium and the beads are formed, have respective indexes of refraction $n_1$, $n_2$ and $n_3$ comprised in the following critical ranges:
$n_1$ from 1.45 to 1.68
$n_2$ from 1.46 to 1.56
$n_3$ from 1.60 to 1.95.

4. In the traffic-regulating incidium as defined in claim 3, reflective aggregates wherein the refractive index $n_1$ of the substantially spherical transparent element is from 1.49 to 1.68, and wherein the ratio $n_3/n_2$ of the refractive indexes of said beads and of said binder medium is from 1.135 to 1.385.

5. A traffic-regulating indicium as defined in claim 1, and comprising a substantial indicium forming area including a discrete number of reflective aggregates having exposed portions so projecting upwardly of the indicium generally planar surface for light impingement at an angle of not greater than 50°, wherein the said aggregates jointly provide a total transparency parameter, as above defined, greater than 0.130, when impinged by grazing light emitted by a source of light located at a distance not greater than 115 meters at a level of about 1.2 meter above the roadway pavement.

6. The traffic-regulating indicium of claim 5, wherein said area comprises reflective aggregates of given average radius $r$ and spaced in said area at such average spacing S that the ratio $S/r$ is comprised from 1 to 8.

7. The traffic-regulating indicium of claim 5, wherein the said area comprises reflective aggregates having exposed portions so projecting upwardly of the indicium generally planar surface and so spacedly arranged in said area that the said grazing light impinges at an angle of incidence which in the average is not less than 60°, and wherein the said total transparency parameter is greater than 0.3.

8. In the traffic-regulating indicium defined in claim 1, reflective aggregates further including an interfaced layer of finite thickness formed at the interface between said polymeric element and said layer of binder substance, said interfacial layer having an index of refraction, which progressively varies from that of said element to that of said layer, whereby no light dissipation by internal reflection occurs at the passage of rays from said element and said layer and viceversa.

* * * * *